(12) United States Patent
Swami

(10) Patent No.: US 7,283,469 B2
(45) Date of Patent: Oct. 16, 2007

(54) METHOD AND SYSTEM FOR THROUGHPUT AND EFFICIENCY ENHANCEMENT OF A PACKET BASED PROTOCOL IN A WIRELESS NETWORK

(75) Inventor: Yogesh Prem Swami, Irving, TX (US)

(73) Assignee: Nokia Corporation, Espoo (FI)

( * ) Notice: Subject to any disclaimer, the term of this patent is extended or adjusted under 35 U.S.C. 154(b) by 534 days.

(21) Appl. No.: 10/136,882

(22) Filed: Apr. 30, 2002

(65) Prior Publication Data

US 2003/0202480 A1 Oct. 30, 2003

(51) Int. Cl.
*H04L 12/26* (2006.01)
(52) U.S. Cl. ............... 370/229; 370/237; 370/394
(58) Field of Classification Search ........... 370/229, 370/349, 394, 230, 231, 232, 237
See application file for complete search history.

(56) References Cited

U.S. PATENT DOCUMENTS

| | | | |
|---|---|---|---|
| 5,974,028 A | 10/1999 | Ramakrishnan | |
| 6,038,216 A | 3/2000 | Packer | |
| 6,215,769 B1 * | 4/2001 | Ghani et al. | 370/230 |
| 6,335,933 B1 * | 1/2002 | Mallory | 370/394 |
| 6,473,399 B1 | 10/2002 | Johansson et al. | |
| 6,493,316 B1 * | 12/2002 | Chapman et al. | 370/231 |
| 6,625,118 B1 * | 9/2003 | Hadi Salim et al. | 370/229 |
| 6,741,555 B1 * | 5/2004 | Li et al. | 370/229 |
| 6,754,200 B1 * | 6/2004 | Nishimura et al. | 370/349 |
| 6,925,060 B2 * | 8/2005 | Mangin | 370/237 |
| 2002/0124096 A1 | 9/2002 | Loguinov et al. | |
| 2003/0105877 A1 | 6/2003 | Yagiu | |

OTHER PUBLICATIONS

Jacobson et al., "Congestion Avoidance And Control", *Proceedings of SIGCOMM* 1988, pp. 1-21.
Mathis et al., "TCP Selective Acknowledgement Options", RFC 2018, Sun Microsystems, Oct. 1996, pp. 1-12.
Allman et al., "TCP Congestion Control", RFC 2581, *The Internet Society*, Apr. 1999, pp. 1-14.
Floyd et al., "An Extension To The Selective Acknowledgement (SACK) Option For TCP", RFC 2883, *The Internet Society*, Jul. 2000, pp. 1-17.
Stewart et al., "Stream Control Transmission Protocol", RFC 2960, *The Internet Society*, Oct. 2000, pp. 1-134.
Paxson et al., "Computing TCP's Retransmission Timer", *The Internet Society*, Nov. 2000, pp. 1-8.
Ludwig et al., "The Eifel Detection Algorithm For TCP", *Ericsson Research*, Feb. 2002, pp. 1-10.

* cited by examiner

*Primary Examiner*—Hassan Kizou
*Assistant Examiner*—Albert T. Chou
(74) *Attorney, Agent, or Firm*—Squire, Sanders & Dempsey L.L.P.

(57) ABSTRACT

A method and system for employing the time stamp and SACK options in TCP and SCTP to modify their operation to initially only send new or lost packets, after a network timeout has occurred. Wireless network resources are saved by reducing the number of packets that are resent to a destination. In particular, the invention detects whether an acknowledgement from a destination is associated with the originally sent packet or a resent packet and uses this information to modify the operation of the protocol to reduce congestion on the network.

30 Claims, 9 Drawing Sheets

METHOD AND SYSTEM FOR THROUGHPUT AND EFFICIENCY ENHANCEMENT OF A PACKET BASED PROTOCOL IN A WIRELESS NETWORK

FIELD OF THE INVENTION

The invention relates generally to employing a packet-based protocol to transmit data, and more particularly to improving the throughput and efficiency of packets transmitted over a wireless network with a packet-based protocol.

BACKGROUND OF THE INVENTION

The Internet is arranged so that a computing device can have a unique name or address by which it can be identified. When data is transmitted over the Internet between computing devices, it is generally broken down into smaller groupings called "packets". In addition to the data which is being transmitted, the packets will normally include important transmission information such as the sender's identity or Internet Packet Address (IP Address), the addressee or intended recipient's IP Address, the actual data (or data request), and so on.

Each packet transmitted from a user's computing device will typically travel through several network devices such as hubs, switches, and routers. If a user's computing device is part of a local area network, the packet will generally travel along a cable until it arrives at a hub to which the cable is connected. The hub or "repeater" as it is sometimes called, will retransmit the packet to another network device (such as a switch) until the packet reaches a router. The router examines the information transmitted with the packet and determines the best way for it to get to its destination.

Once the router has determined how the packet is to be sent, it selects another router at some other location and transmits the message to the router in the direction the packet is intended to travel. For example, if the message is going from New York to California, the router might send the packet to a router located in an intermediate city such as Chicago along a high speed communication channel. Once there, another router will determine a subsequent router to which the packet will be sent next. In this way, the packet is transmitted from router to router until the packet has nearly reached its destination.

When the packet is near to its destination, it is eventually passed to a local hub, which retransmits the message to its intended recipient computing device. The recipient computing device then reassembles the packet with other parts of the original message to create the complete set of transmitted data. However, when a particular network device reaches maximum capacity due to some overload condition, packets are typically dropped by the network device, i.e., the packets are discarded and not forwarded to their destination.

In wireless networks, communicated data packets are typically queued up at a link (network device) in a channel established between a sender and a destination when there is a loss of connectivity. Bad channel conditions, such as cellular reselection, cellular hand offs and General Packet Radio Service (GPRS) suspend resume mechanisms, can cause a channel to lose connectivity for a significant period of time. However, once connectivity is re-established and the channel is ready for transmission again, the queued up data packets at the network device are transmitted normally over the wireless network towards their destination.

Typically, most network devices in a channel established in a wireless network can queue up communicated data packets, e.g., mobile devices, base stations and routers. Unfortunately, this type of link behavior can cause problems with packet based protocols such as Transmission Control Protocol (TCP) and Stream Control Transmission Protocol (SCTP). For more detailed information regarding these protocols see Request For Comments (RFC) 2018, 2581, 2883, 2960, and 2988, which are herein incorporated by reference.

The TCP and SCTP protocols are designed to guarantee delivery of data packets and also guarantee that the packets will be delivered in the same order in which they were sent. When a sender employing either of these protocols does not receive an acknowledgement for a particular packet after a round trip timeout (RTO) has expired, the protocol will undergo a slow start mechanism whereby its congestion window is reduced to one packet. Also, the protocol makes the assumption that all data packets (or their acknowledgements) during the RTO period of time were lost. To recover from this perceived "loss of packets" and to avoid further congestion in the network, the protocol will slow start by resending the first unacknowledged data packet over the network towards the destination.

However, when an RTO expires for data packets sent over a wireless network, the data packets and/or their acknowledgements may not be lost. Instead, they may be queued up at some link in the channel between the sender and the destination. Consequently, in the past, a wireless network might become congested due to the sending and resending of copies of the same data packets to a destination, i.e. the initial queued up data packet and the resent copy of the data packet. In addition, at the sender, the protocol would often increase its window size to compensate for the delayed acknowledgements, which in turn could cause further congestion on a wireless network. It is with respect to these considerations and others that the present invention has been made.

SUMMARY OF THE INVENTION

The present invention is directed at addressing the above-mentioned shortcomings, disadvantages and problems, and will be understood by reading and studying the following specification.

The invention provides a method for communicating data with a packet based protocol over a network. The packet-based protocol is employed to send a set of packets over the network towards a destination. Each packet can include instructions for the destination to provide an acknowledgement indicating every received packet in the set. If the acknowledgement for receiving at least one of the packets in the set is delayed, the set of packets is extended to include another packet. Periodically, at least the other packet is sent towards the destination until another acknowledgement is received indicating that at least the other packet is received by the destination. The acknowledgement of the other packet in the extended set is employed to provide information identifying each unreceived packet in the extended set. This identification information is employed to periodically resend at least one unreceived packet in the extended set until the destination acknowledges receiving each resent packet in the extended set.

In accordance with another aspect of the invention, the set is extended by one new packet that is sent periodically to the destination until it is acknowledged.

In accordance with yet another aspect of the invention, periodically extending the set of packets to include a new packet, which is periodically sent to the destination until another acknowledgement is received indicating that the new packet in the extended set is received by the destination.

In accordance with still another aspect of the invention, dynamically adjusting a size of the set of packets in relation to the performance of sending and receiving acknowledgement for each packet sent to the destination. Also, automatically adjusting the periodic sending of the other packet towards the destination. Further, automatically adjusting the periodic resending of each unreceived packet towards the destination.

In accordance with another aspect of the invention, the packet-based protocol includes at least one of TCP and SCTP. Also, the acknowledgement from the destination is at least one of a SACK and an ACK message. Additionally, at least a portion of the network is a wireless network.

In accordance with yet another aspect of the invention, dynamically adjusting an amount of packets in the set in relation to the performance of the network. Also, when each packet in the set is received by the destination, employing the packet-based protocol to send another set of packets over the network towards the destination. Each sent packet includes instructions for the destination to provide an acknowledgement indicating every received packet in the other set. Additionally, the set of packets are disposed in a sequence and each packet is provided to the destination in relation to the order of its position in the sequence.

In accordance with yet another aspect of the invention, an apparatus and a system may be employed to practice substantially the same actions discussed above for the method.

DETAILED DESCRIPTION OF THE PREFERRED EMBODIMENT

Figure 1:
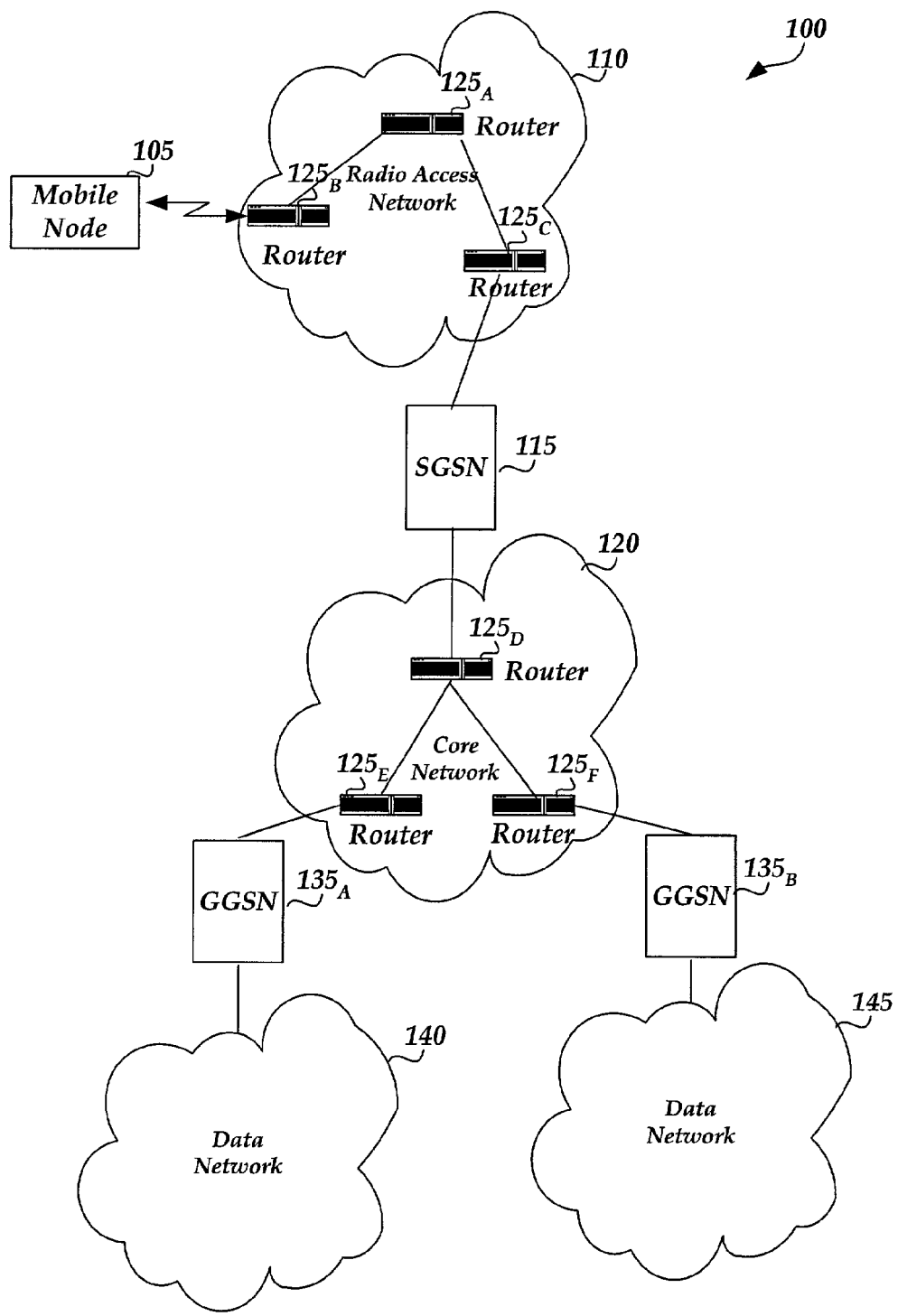
FIG. 1 illustrates an exemplary network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element that monitors a load for a link within a path. The term "link load" refers to the load associated with the node. The term "flow" means a flow of packets. The term "user" refers to any person or customer such as a business or organization that employs a mobile device to communicate or access resources over a mobile network. The term "operator" refers to any technician or organization that maintains or services a packet based network. The term "identifier" includes an MSISDN number, an IP address, or any other information that relates to the location or identity of the user. The term "modulated data signal" means a signal that has one or more of its characteristics set or changed in such a manner as to encode information in the signal.

The term "router" refers to a dedicated network element that receives packets and forwards them to their destination. In particular, a router is used to extend or segment networks by forwarding packets from one logical network to another. A router typically operates at layer 3 and below of the Open Systems Interconnection (OSI) reference model for networking. However, some routers can provide additional functionality that operates above layer 3 of the OSI reference model.

Referring to the drawings, like numbers indicate like parts throughout the views. Additionally, a reference to the singular includes a reference to the plural unless otherwise stated or is inconsistent with the disclosure herein.

This invention provides a method and system for optimizing the performance of a packet-based protocol that guarantees delivery of data packets in a wireless network, e.g., TCP and SCTP. TCP/SCTP performance can be substantially degraded in a wireless network due to certain unique challenges that are not found when these protocols are employed in a wired network. For example, high bit error rates, cell reselection, cell hand off, and GPRS suspend resume mechanisms can cause long delays in transmitting queued data packets in a wireless network. Unfortunately, any long delay in the flow of data packets that causes a wireless network time out has been automatically construed by the TCP/SCTP protocols as severe network congestion. Further, since these protocols assume that all of the unacknowledged packets sent over the congested network have been lost, they automatically retransmit these packets again.

However, in wireless networks, these delayed data packets are often not lost. Instead, they are queued up at a network device, waiting to be forwarded to the next network device coupled to the wireless network when the channel for communicating the flow of packets is restored. Thus, the typical retransmission mechanisms employed by the packet-based protocols such as TCP and SCTP can be wasteful of wireless network resources and can reduce network throughput by unnecessarily increasing congestion in a wireless network that already is experiencing long delays in communicating packets of data.

The invention provides for employing the selective acknowledgement (SACK) and time stamp options in the TCP or SCTP protocols to modify their congestion control algorithms after a network timeout has occurred. The invention can prevent throughput degradation and congestion in a network by reducing the number of data packets that are unnecessarily retransmitted by the sender. The invention employs the SACK signaling option to modify slow start behavior by first sending new or lost data packets after a significant delay in receiving an acknowlegement from a destination has occurred, i.e., a network timeout.

Previously, when long delays in receiving acknowledgements occurred, the TCP/SCTP protocols' congestion control algorithms reset the state of the congestion window for the previously sent and unacknowledged packets. All of the unacknowledged packets in the congestion window were retransmitted to the destination, regardless of whether or not the acknowledgements to the original packets were later received. In the past, these algorithms increased the rate of resending packets exponentially (the slow start phase) from 1 to some upper limit, i.e., SSTHRESH without considering whether the acknowledgements were from either the initially sent packets or the resent packets which led to further congestion of the network. Traditionally, when a network timeout occurred, the TCP/SCTP protocols have assumed that all unacknowledged packets were lost (not delivered to the destination).

In contrast, the invention employs the time stamp and SACK options to modify the operation of the TCP/SCTP protocols to initially only send new or lost packets, after a network timeout has occurred. In this way, the invention saves wireless network resources by reducing the number of packets that are resent to a destination. In particular, the invention detects whether an acknowledgement from a destination is associated with the originally sent packet or a resent packet and uses this information to modify the operation of the protocol to reduce congestion on the network.

Thus, the invention at least provides for sending a new data packet when a timeout period has expired, providing improved congestion control in cases of spurious timeouts in a network, enabling at least two separate congestion control methods to be selected (conservative and moderate) and enabling any network that uses TCP/SCTP to employ the invention.

Illustrative Operating Environment

With reference to FIG. 1, an exemplary mobile network in which the invention may operate is illustrated. As shown in the figure, mobile network 100 includes mobile node 105, radio access network (RAN) 110, SGSN 115, core network 120, routers $125_{A-F}$, GGSNs $135_{A-B}$, data network 140, and data network 145.

The connections and operation for mobile network 100 will now be described. Mobile node 105 is coupled to radio access network (RAN) 110. Generally, mobile node 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. Mobile node 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as mobile device 105. Radio access network 110 may include both wireless and wired telecommunication components. For example, radio access network 110 may include a cellular tower and/or base stations that are linked to a wired telecommunication network. Typically, the cellular tower carries wireless communication to and from cell phones, pagers, and other wireless devices, and the wired telecommunication network carries communication to regular phones, long-distance communication links, and the like. As shown in the figure, RAN 110 includes routers $125_{A-C}$.

According to one embodiment of the invention, routers $125_{A-C}$ may calculate their own link loads as well as process link loads relating to other nodes on the network. The routers may send a warning message to other routers within the network when its link load exceeds a configurable threshold. In yet another embodiment, one or more of routers $125_{A-C}$ may be configured as an internal router for a base station that is coupled to a wired telecommunication network and in communication with wireless devices such as mobile node 105.

Some nodes may be General Packet Radio Service (GPRS) nodes. For example, Serving GPRS Support Node (SGSN) 115 may send and receive data from mobile stations, such as mobile node 105, over RAN 110. SGSN 115 also maintains location information relating to mobile node 105. SGSN 115 communicates between mobile node 105 and Gateway GPRS Support Node (GGSN)s 135.sub.A-B though core network 120.

Core network 120 is an IP packet based backbone network that includes routers, such as routers $125_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow mobile node 105 to access network 140 and network 145.

Furthermore, computers, and other related electronic devices may be connected to network 140 and network 145. The public Internet itself may be formed from a vast number of such interconnected networks, computers, and routers. Mobile network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Figure 2:
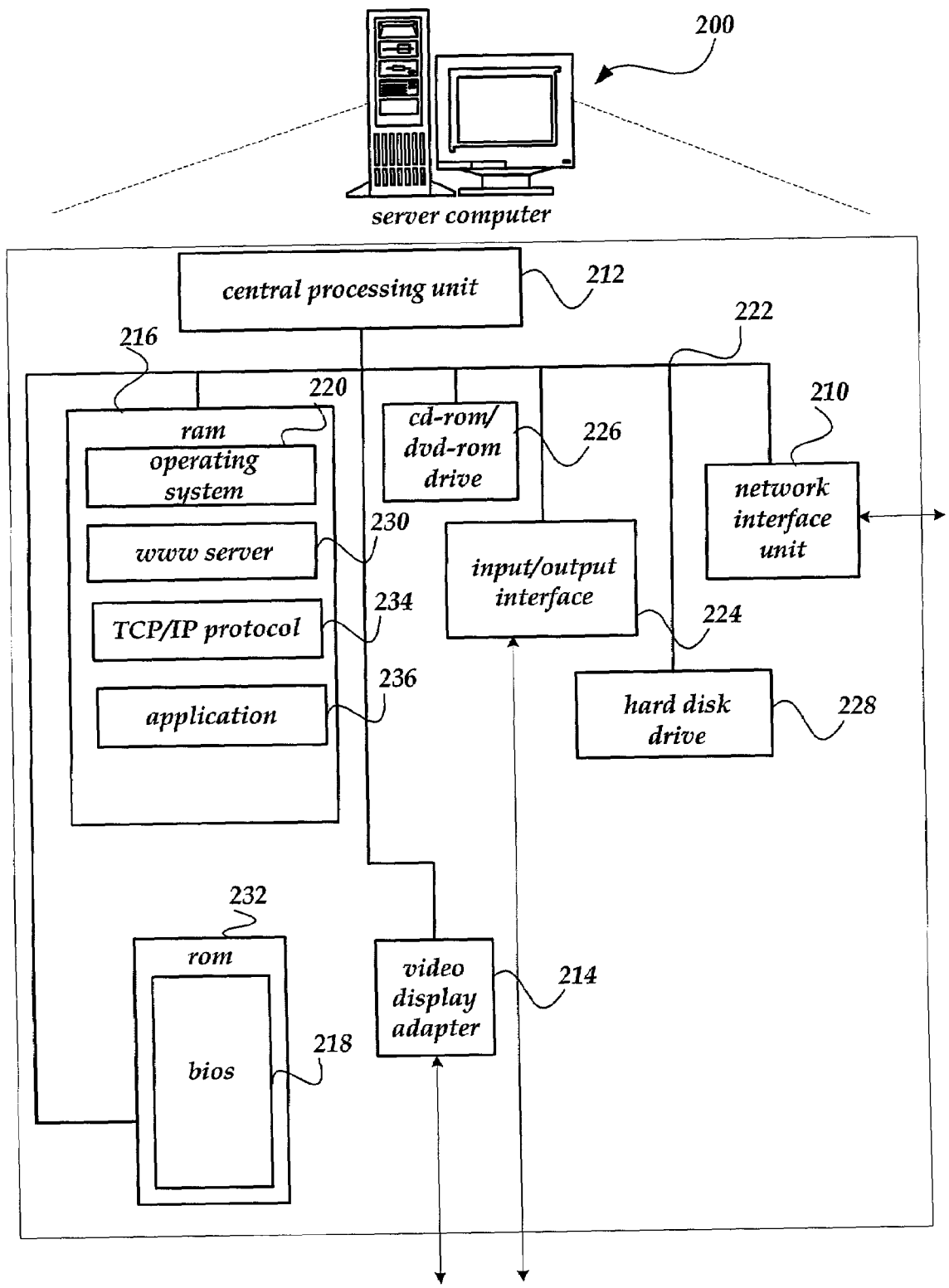
FIG. 2 shows an exemplary server computer that can operate as a destination for packets sent by a sender.

FIG. 2 illustrates an exemplary server computer 200 that is operative to provide a destination, e.g., World Wide Web (WWW) server 230, for packets sent by a mobile node over a network. Accordingly, WWW server 230 can employ TCP Protocol 234 to transmit content to a browser executing on a requesting device such as a mobile node. For instance, WWW server 230 may transmit data packets for pages, forms, streaming media, voice and the like, over the Internet, or some other communications network.

Server computer 200 may include many more components than those shown in FIG. 2. However, the components shown are sufficient to disclose an illustrative embodiment for practicing the present invention. Server computer 200 is connected to a communications network, via network interface unit 210 which may be used with various communication protocols including, but not limited to, TCP/IP protocol 234.

Server computer 200 also includes processing unit 212, video display adapter 214, and a mass memory, all connected via bus 222. The mass memory generally includes RAM 216, ROM 232, and one or more permanent mass storage devices, such as hard disk drive 228, a tape drive, CD-ROM/DVD-ROM drive 226, and/or a floppy disk drive. The mass memory stores operating system 220 for controlling the operation of server computer 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of server computer 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory stores applications including WWW server 230, TCP/IP protocol 234, and another application 236 for performing other actions. WWW server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with external security applications (not shown), to send and receive private information in a secure fashion.

Server computer 200 also comprises input/output interface 224 for communicating with external devices, such as a mouse, keyboard, scanner, and the like. Likewise, server computer 200 may further comprise additional mass storage facilities such as CD-ROM/DVD-ROM drive 226 and hard disk drive 228.

Figure 3:
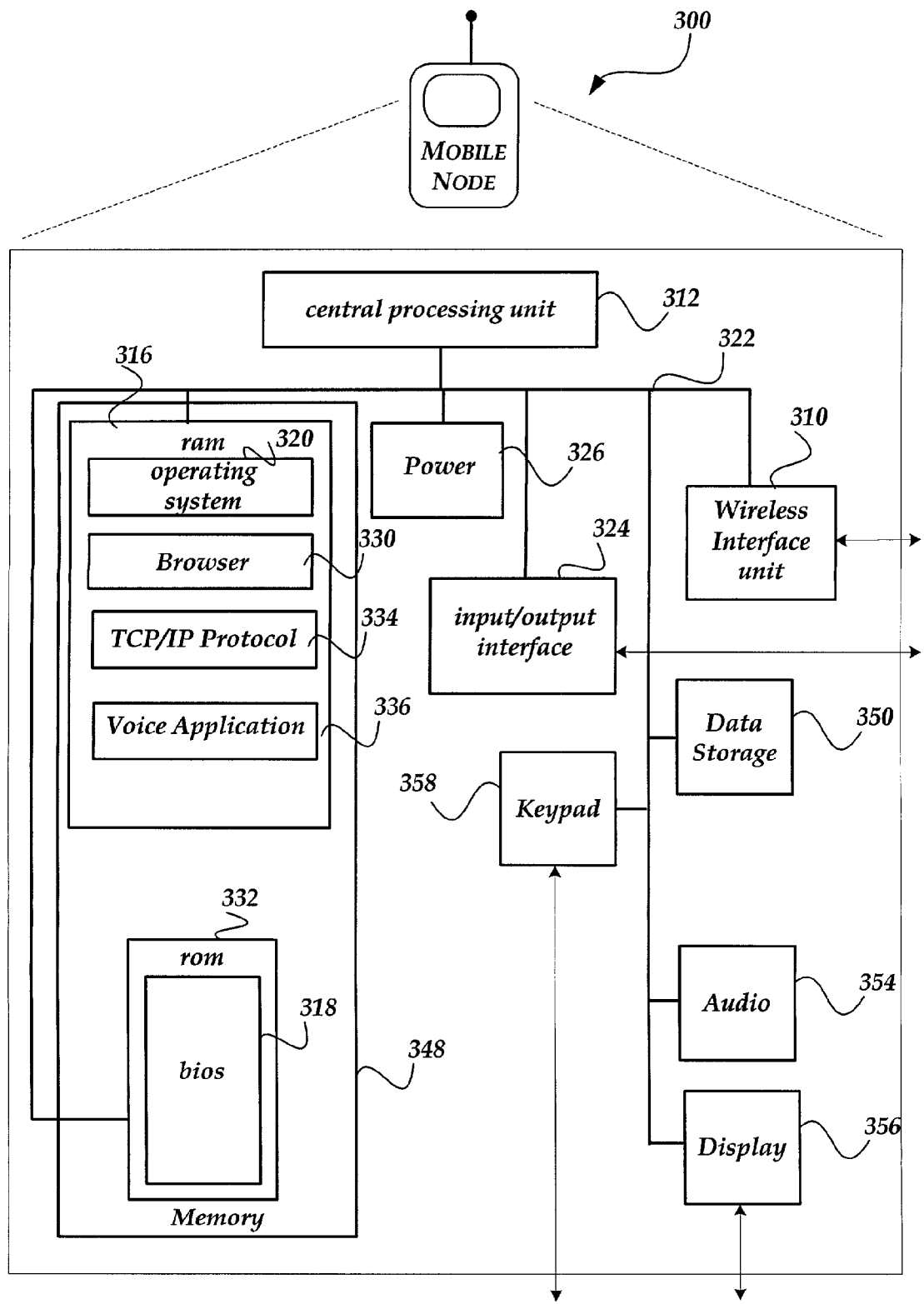
FIG. 3 illustrates an exemplary mobile node that can operate as a sender of packets to a destination.

FIG. 3 shows an exemplary mobile node 300, according to one embodiment of the invention. Mobile node 300 may be arranged to transmit and receive packetized data. For instance, mobile node 300 may send and receive packets with other mobile nodes and servers (See FIG. 2 and related discussion). The communication of packets may take place, in whole or in part, over a mobile network, Local Area Network (LAN), Wide Area Network (WAN), Internet, and the like.

Mobile node 300 may include many more components than those shown in FIG. 3. However, the components shown are sufficient to disclose an illustrative embodiment for practicing the present invention. As shown in the figure, mobile node 300 includes processing unit 312, memory 348, RAM 316, ROM 332, operating system 320, application 330, TCP/IP Protocol 334, data storage 336, BIOS 318, power 326, input/output interface 324, wireless interface unit 310, audio 354, display 356, and keypad 358.

Mobile node 300 may connect to a mobile network, via wireless interface unit 310 which is constructed for use with various communication protocols including TCP/IP protocol 334. Wireless interface unit 310 may include a radio layer (not shown) that is arranged to transmit and receive radio frequency communications. Wireless interface unit 310 connects mobile device 300 to external devices, via a communications carrier or service provider.

Mass memory 348 generally includes RAM 316, ROM 332, and voice application 336. The mass memory stores operating system 320 for controlling the operation of mobile node 300. It will be appreciated that this component may comprise a general purpose server operating system as is known to those of ordinary skill in the art, such as a version of UNIX, LINUX™, MICROSOFT WINDOWS®, or SYMBIAN®. Basic input/output system ("BIOS") 318 is also provided for controlling the low-level operation of mobile node 300.

Data storage 350 may include various types of media including, but not limited to, volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the mobile node.

The mass memory also stores program code and data used within mobile node 300. More specifically, the mass memory stores applications when executed by mobile node 300, transmit and receive WWW pages, e-mail, voice, streaming audio, video, and the like. One or more programs may be loaded into memory 348 and run under control of operating system 320. Mobile node 300 also includes ROM 332 which cab be used to store data that is not lost when the mobile node loses power or is turned off.

Mobile node 300 also comprises input/output interface 324 for communicating with external devices, such as headsets, keyboards, pointers, controllers, modems, and the like. Data storage 350 is utilized by mobile node 300 to store, among other things, applications, databases and data Keypad 358 may be any input device arranged to receive inputs from a user. For example, keypad 358 may be a push button numeric dialing, or a keyboard. Display 356 may be a liquid crystal display, or any other type of display commonly used in mobile devices. Display 356 may also be a touch screen arranged to receive a users inputs. Power supply 326 provides power to mobile node 300. According to one embodiment, power is provided by a rechargeable battery. The power may be also be provided by an external power source, such as an AC adapter or a powered docking cradle that supplements or recharges a battery.

Mobile node 300 as shown includes audio interface 354 which is arranged to receive and produce sounds, i.e., audio signals. For example, audio interface 354 may be coupled to a speaker and microphone (not shown) to enable audio communication for a telephone call.

Illustrative Packet Flows between Sender and Destination

Figure 4:
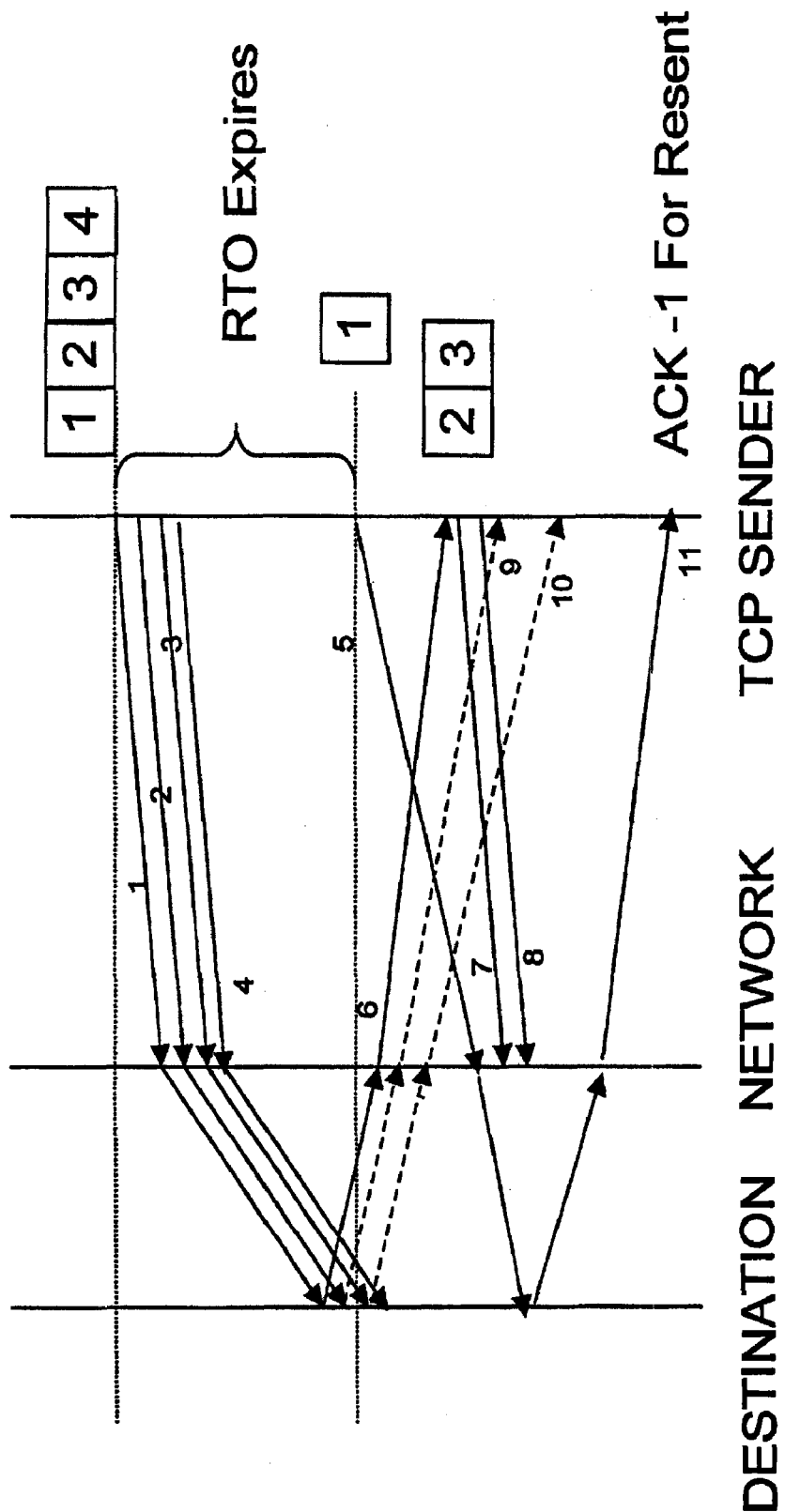
FIG. 4 shows an exemplary timing diagram illustrating the flow of packets and acknowledgements over a network between a sender and a destination.

FIG. 4 illustrates employing an exemplary TCP (or SCTP) protocol to communicate a flow of packets between a sender and a destination over a network without using the benefits of the invention. Starting at the top portion of FIG. 4, the TCP protocol has a congestion window set to four and four packets have been sent to the network towards the destination. These four packets are represented by rays 1, 2, 3, and 4 in FIG. 4.

Moving down FIG. 4 to the middle portion of the drawing, a network timeout has occurred (can be due to many reasons as discussed above and below) which results in a significant delay in the ability of the destination to provide an acknowledgement to the first packet in the congestion window. When the Retransmission Time Out (RTO) timer residing at the sender expires, the protocol automatically enters a slow start phase where the first packet (ray 5) in the congestion window is resent towards the destination.

Moving to the lower portion of FIG. 4, the acknowledgement for the original sending of the first packet (ray 1) to the destination finally reaches the sender (ray 6). However, since the protocol residing at the sender can not differentiate between acknowledgements for the original or resent first packets, it falsely associates the received acknowledgement (ray 6) with the resent first packet (ray 5) and not the originally sent first packet (ray 1). In this case, the protocol is "fooled" into assuming that the delay in receiving acknowledgements is now less than the RTO and resends packets 2 and 3 (rays 7 and 8).

Moving further down towards the lower portion of FIG. 4, the acknowledgements for the originally sent second and third packets are received by the sender (rays 9 and 10) and the protocol is again fooled into assuming that the network is not experiencing significant delay. When the acknowledgement for the resent first packet is received by the sender (ray 11), the protocol does not employ this information to recognize that the network is exhibiting delays significantly larger than the RTO. Thus, the protocol continues to increase its congestion window and resend more packets into a network that is already exhibiting timeout issues.

There are several inefficiencies associated with the operation of the TCP or SCTP protocols in networks with spurious timeouts. First, in a congestion window of size N, packets are unnecessarily sent twice, and therefore waste resources in a network, especially in a wireless network.

The slow-start behavior of the TCP/SCTP protocol in these circumstances can cause greater congestion. This is because the acknowledgements generated for packets queued into the network will falsely cause the sender to send $$\frac{3N}{2} + 1$$

packets into the network for N packets removed from the network. Also, since the sender can be idle for a long time (RTO), sending additional packets without probing the state of the network can cause congestion. Unfortunately, the TCP and SCTP protocols make the assumption that late packets are lost (never received by the destination), and therefore any acknowledgement received for a particular packet must have been in response to the resent packet.

Additionally, during the slow start phase, which ends when the congestion window is increased from one to some value, i.e., SSTHRESH where SSTHRESH=flight_size/2=N/2. The sender increases its congestion window by one complete Maximum Segment Size (MSS), i.e., the maximum size of an IP packet.

The term "SS_PTR" refers to Slow Start Pointer, which is the sequence number of the last byte of data in transit when the timeout occurred.

For the first N/2 acknowledgements to sent packets, the congestion window is reset to N/2. Next, the sender exits the slow start phase and enters congestion avoidance. Thus, for the first N/2 acknowledgements, the sender will have sent 2*N/2 packets, and for the rest of the N/2 acknowledgements, it will send N/2 additional packets. Moreover, the total number of packets sent into the network towards the destination will be 3*N/2+1 (the 1 is for the packet sent as a result of the timeout).

For the TCP and SCTP protocols, whenever a sender does not receive an acknowledgement after the RTO timer expires, the protocols enter a slow start phase. During the slow start phase, the sender sets its congestion window to one segment and resends the first unacknowledged packet into the network. The sender uses this resent packet as a probe to determine the state of the network, so that new packets are only resent if the network can handle it. Also, the TCP/SCTP protocols assume that if packets are not received (and acknowledged) before the RTO expires, then all those packets must have been lost.

Figure 5:
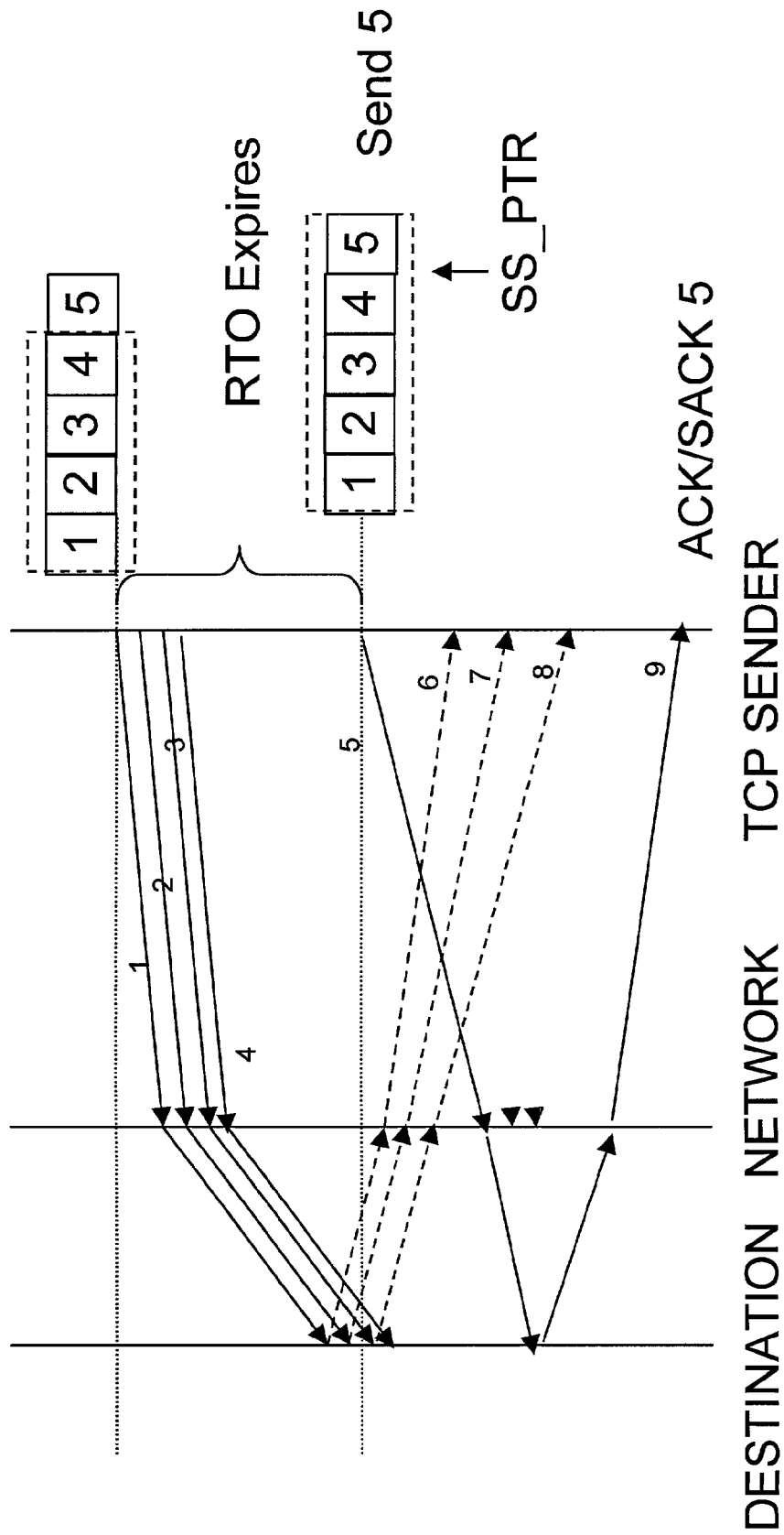
FIG. 5 illustrates another exemplary timing diagram showing the flow of packets and acknowledgements over a network between a sender and a destination.

FIG. 5 illustrates the timing of packets between a sender and destination when the present invention is employed to enhance the operation of the TCP and SCTP protocols, thereby avoid unnecessary resending of packets and improving congestion control behavior for packets sent over a network.

When the TCP sender's RTO timer expires, instead of sending the first unacknowledged data packet, the enhanced protocol increases its congestion window by one, sets the time out period to double the size of the RTO and sends a new data packet (ray 5) towards the destination. By sending one packet when the original RTO expires, the network can be probed to determine if it is congested. However, from the network's point of view it does not matter which packet is sent/resent, and therefore sending a new data packet has the same affect as resending a packet. This aspect of the invention is substantially similar, albeit different in other ways, to the congestion control and avoidance mechanisms in unenhanced TCP and SCTP protocols.

Although not shown here, in the case where the sender does not have any new data packets to send outside its present congestion window, or if the destination's flow control window cannot sustain any more new packets from the sender, the invention does modify the operation of the TCP/SCTP protocols.

Returning to the flow of packets shown in FIG. 5, after sending the new (fifth) packet, the TCP sender keeps a new state variable that points to the last unacknowledged packet forwarded to the network, i.e., the slow start pointer (SS_PTR) which is the sequence number of the last byte of data in flight when the timeout period expired. If the sender times out again, because it did not receive the acknowledgement for the fifth packet, it increases the congestion window by one and sends a sixth packet towards the destination. The RTO calculation is not changed (i.e., after first timeout, the sender set its timeout period to twice the RTO). Also, the congestion window can be increased by one until it reaches an upper limit and then the last sent data packet is resent until an acknowledgement is received.

Eventually, when the TCP sender receives an acknowledgement for the newly sent packet or some older packet, either as an acknowledgement (ACK), or as a selective acknowledgement (SACK), the timeout period is reset to the value of the RTO and employs one of the congestion control algorithms discussed below.

Figure 6:
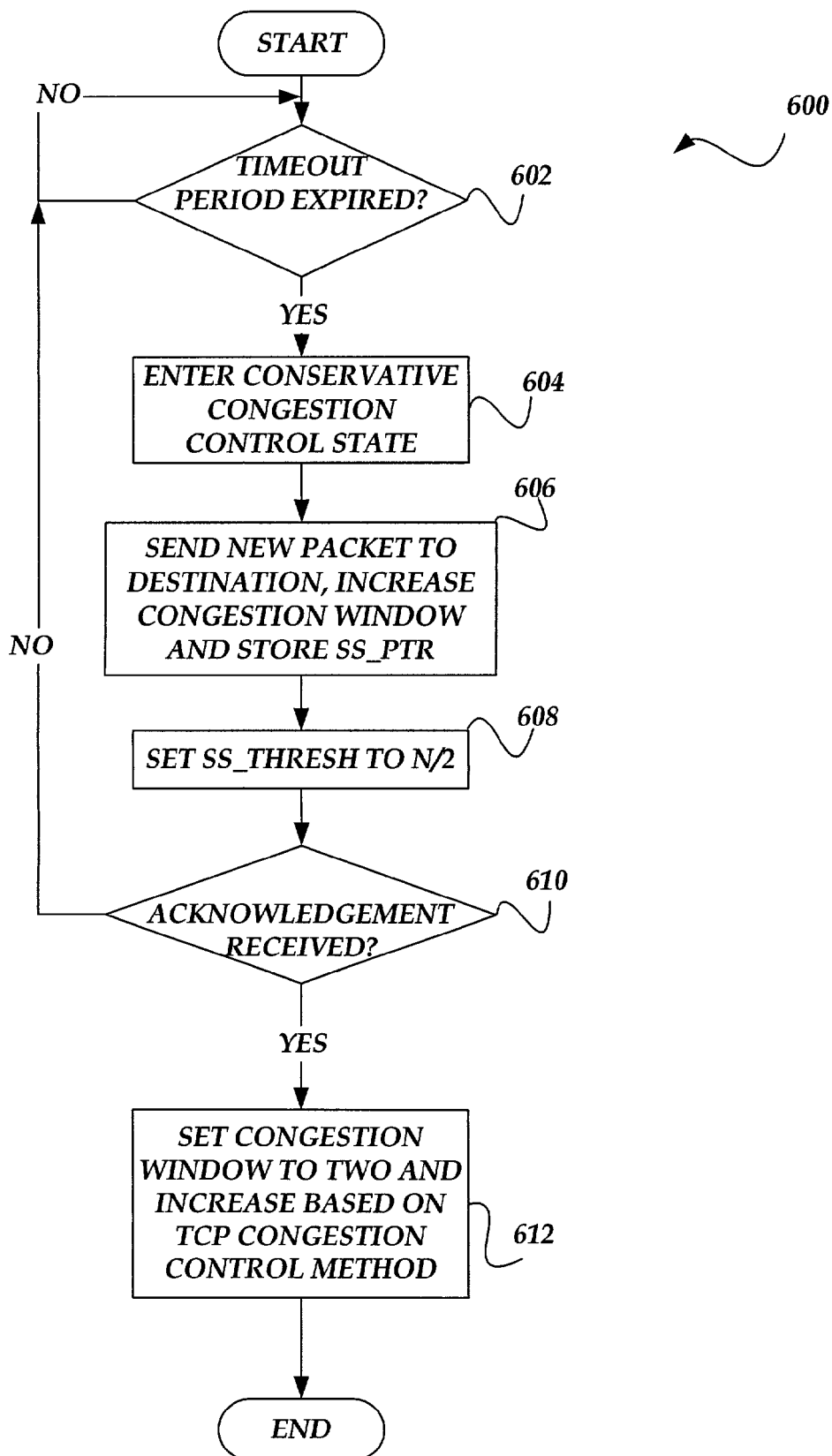
FIG. 6 shows a flow chart illustrating an overview of the actions performed for a conservative congestion control method.

FIG. 6 illustrates flow chart 600, which represents actions performed for a conservative congestion control method. Moving from a start block, the process flows to decision block 602 where a determination is made whether a time out period has expired for an acknowledgement from a destination for a packet that was previously forwarded by a sender. If false, the process continues to loop through the actions at decision block 602. However, when the time out period has expired at decision block 602, the process moves to block 604 where the TCP protocol operating at the sender enters a "Conservative SS" state, as shown in the state diagram illustrated in FIG. 8. The sender will remain in this state until it receives an acknowledgement for a packet with a sequence number greater than the value of the SS_PTR.

Advancing to block 606, the process increases the congestion window by one, the sender sends a new data packet towards the destination and stores the value of the SS_PTR. Stepping to block 608, the value of SSTHRESH is set to N/2, where N is the number of data packets in "flight" towards the destination.

At decision block 610, a determination is made as to whether an acknowledgement was received for the last sent packet before the timeout period expired. When the determination at decision block 610 is false (the timeout period has expired), all current state information is released and the process re-enters the conservative congestion control state by looping back to block 602 and begins performing substantially the same actions as discussed above and below.

In contrast, if the determination at decision block 610 is affirmative, the timeout period for the sender is reset. Further, when any other acknowledgement is received (for either old or new packets) before the timeout period expires, the timeout period is reset. However, whenever an acknowledgement is received for a packet that is less than the value of SS_PTR, no new data packet will be sent, (i.e., the congestion window is reduced by one for each incoming acknowledgment less than or equal to SS_PTR). Furthermore, once an acknowledgement for a packet with a sequence number greater than SS_PTR is received, the process exits the conservative congestion control state and moves to block 612. It is understood that this acknowledgement could take the form of a SACK, ACK and the like.

At block 612, the congestion window is set to two and increased in accordance with the TCP Congestion Control method disclosed in RFC 2581, which is herein incorporated by reference. Next, the process moves to an end block and returns to processing other actions.

In the conservative congestion control method, if there is a spurious timeout because of mobility issues (cell reselection, etc.) and there is a change in a subnetwork, the sender's state would not reflect the buffering capacity of the new subnetwork and the sender should re-calculate the network state parameter SSTHRESH.

Additionally, since a new data packet is sent after a timeout period expires and without any acknowledgement, it is possible that this newly sent packet can also be lost because the network might not have sufficient buffering capacity. Therefore, on the receipt of a first acknowledgement that is less than SS_PTR, a single new MSS size packet can be sent since this acknowledgement reflects that at least one packet has left the network and therefore there is a higher probability for this newly sent packet to reach the destination. Furthermore, no additional new packets are sent for subsequently sent packets when the invention employs the conservative congestion control method.

Figure 7:
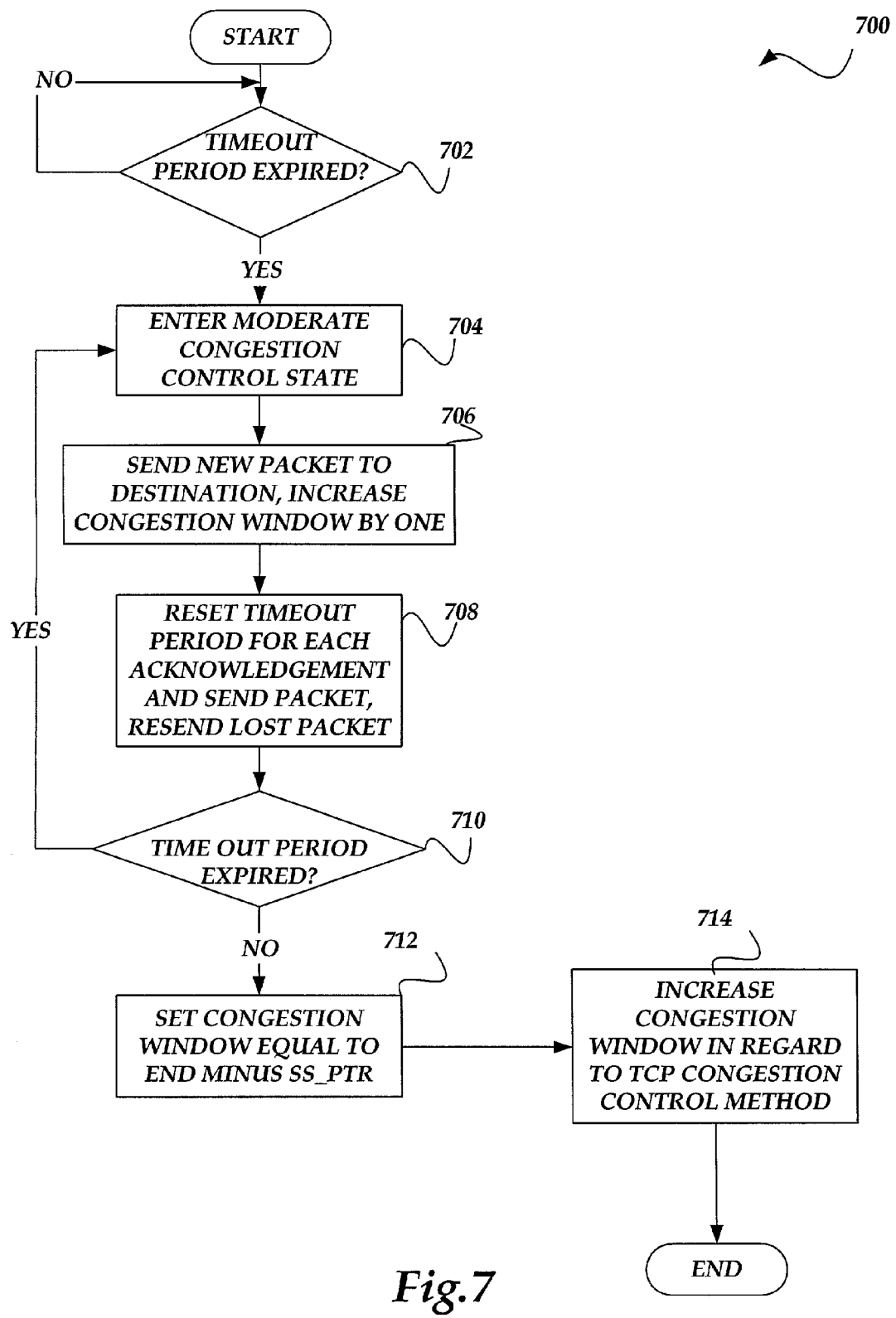
FIG. 7 illustrates another flow chart showing an overview of the actions performed for a moderate congestion control method.

FIG. 7 illustrates a flow chart 700, which represents actions performed in an inventive moderate congestion control method. Moving from a start block, the process flows to decision block 702 where it loops until the timeout period expires for receiving an acknowledgement to a packet that was previously sent by a sender towards a destination. When the timeout period has expired, the process moves to block 704 where the process enters the moderate congestion control state. Next, the process advances to block 706 where the congestion window is increased by one and a new data packet is sent to the destination by the sender.

At block 708, the timeout period is reset each time an acknowledgement is received for a previously sent packet. Also, the size of the congestion window is frozen to the same value as when it entered the moderate congestion control method/state. One new or previously lost data packet is sent for each received acknowledgement from the destination. Also, when there are more than three duplicate acknowledgements, a lost packet is resent according to a fast retransmit mechanism that employs the presence of SACK information.

Flowing to decision block 710, a determination is made if the timeout period has expired for the sender. If true, the process loops back to block 704 and performs substantially the same actions discussed above and renters the moderate congestion control state.

However, if the timeout period has not expired, the process moves to block 712 where the sender exists from the moderate congestion control state and sets the congestion window (CWND) to CWND=end−SS_PTR. This equation takes into account the case of congestion in which all or part of data was lost because it represents the amount of new data packets that are sent into the network for each of the old acknowledgements. Next, the process advances to block 714 where the congestion window is increased in the TCP congestion control method described in RFC 2581, which is herein incorporated by reference. Next, the process moves to an end block and returns to processing other actions.

Although the moderate congestion control method may appear to have better throughput than the conservative congestion control method discussed above, it is preferably employed when no change of subnetworks is likely to occur.

Figure 8:
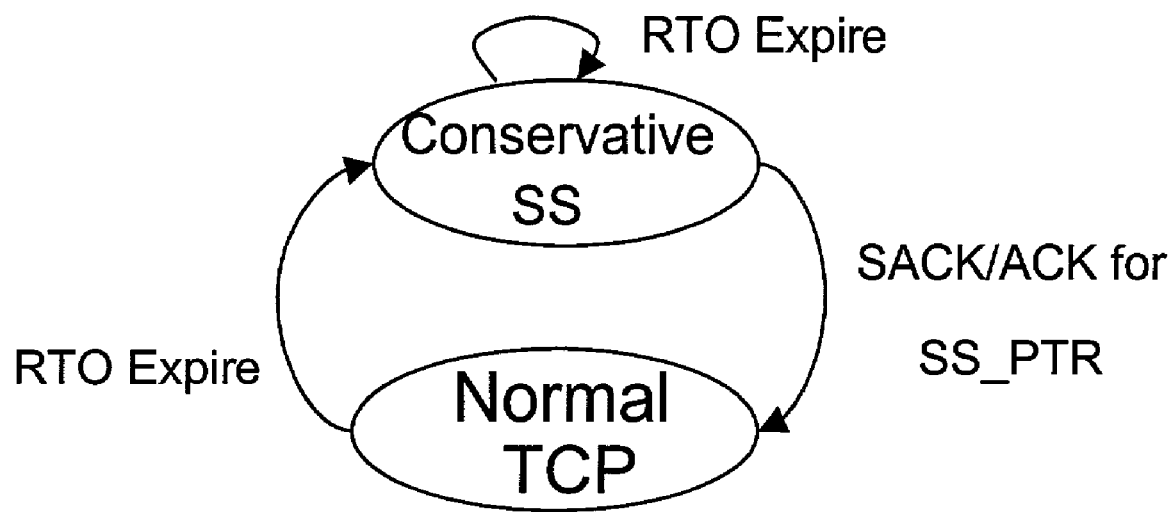
FIG. 8 shows a state diagram for a conservative congestion control method.

FIG. 8 illustrates a state diagram that shows an overview of a process when a conservative congestion control method is employed. Briefly stated, packets are initially sent by a sender to a destination in accordance with normal TCP protocol behavior until an RTO associated with a sent packet expires, i.e., an acknowledgement from the destination is not received for a long period of time.

When an RTO expires, the sender stops using normal TCP behavior to send packets and enters another state where packets are sent to the destination in accordance with a conservative congestion control method, as discussed above. The process remains in this state so long as an acknowledgement for a sent packet is not received before its RTO expires. When an acknowledgement (SACK or ACK message) is received before the RTO expires, the sender stops employing the conservative congestion control method and returns to using normal TCP protocol behavior to send packets to the destination. If another RTO expires, the process repeats itself in substantially the same manner discussed above.

Figure 9:
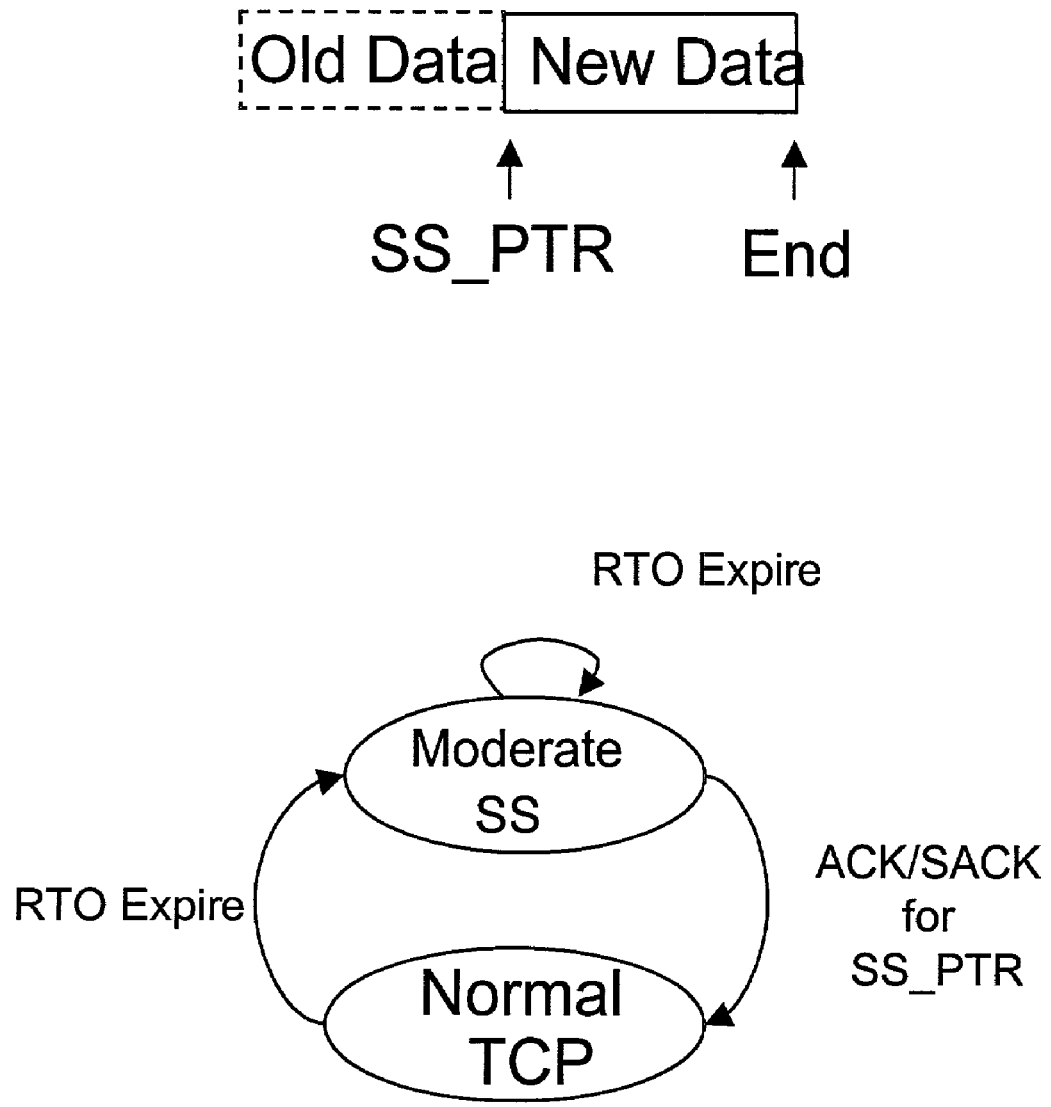
FIG. 9 illustrates another state diagram for a moderate congestion control method in accordance with the invention.

FIG. 9 illustrates a state diagram that shows an overview of a process when a moderate congestion control method is employed. Briefly stated, packets are initially sent by a sender to a destination in accordance with normal TCP protocol behavior until an RTO associated with a sent packet expires, i.e., an acknowledgement from the destination is not received for a long period of time.

When an RTO expires, the sender stops using normal TCP behavior to send packets and enters another state where packets are sent to the destination in accordance with a moderate congestion control method, as discussed above. The process remains in this state so long as an acknowledgement for a sent packet is not received before its RTO expires. When an acknowledgement (SACK or ACK message) is received before the RTO expires, the sender stops employing the moderate congestion control method and returns to using normal TCP protocol behavior to send packets to the destination. If another RTO expires, the process repeats itself in substantially the same manner discussed above.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for communicating data with a packet based protocol over a network, comprising:
    (a) employing the packet-based protocol to send a set of packets over the network towards a destination;
    (b) if the acknowledgement for receiving at least one of the packets in the set is delayed, extending the set of packets to include another packet and periodically sending at least the other packet towards the destination until an acknowledgement is received indicating that at least the other packet in the extended set is received by the destination; and
    (c) employing the acknowledgement of the other packet in the extended set that is sent periodically to provide information identifying each unreceived packet in the extended set and employing the identification information to periodically resend at least one unreceived packet in the extended set until the destination acknowledges receiving each resent packet in the extended set.

2. The method of claim 1, further comprising extending the set by one new packet that is sent periodically to the destination until it is acknowledged.

3. The method of claim 1, subparagraph (b), further comprising periodically extending the set of packets to include a new packet and periodically sending the new packet towards the destination until another acknowledgement is received indicating that the new packet in the extended set is received by the destination.

4. The method of claim 1, further comprising dynamically adjusting a size of the set of packets in relation to the performance of sending and receiving acknowledgement for each packet sent to the destination.

5. The method of claim 1, further comprising automatically adjusting the periodic sending of the other packet towards the destination.

6. The method of claim 1, further comprising automatically adjusting the periodic resending of each unreceived packet towards the destination.

7. The method of claim 1, wherein the packet-based protocol includes at least one of TCP and SCTP.

8. The method of claim 1, wherein the acknowledgement from the destination is at least one of a SACK message and an ACK message.

9. The method of claim 1, wherein at least a portion of the network is a wireless network.

10. The method of claim 1, wherein at least a portion of the network is a wired network.

11. The method of claim 1, further comprising enabling the receiving of the acknowledgement from the destination for each packet in the set that is received by the destination.

12. The method of claim 1, wherein an amount of packets in the set is dynamically adjusted in relation to the performance of the network.

13. The method of claim 1, further comprising:
    if each packet in the set is received by the destination, employing the packet-based protocol to send another set of packets over the network towards the destination, each packet in the other set including instructions for the destination to provide an acknowledgement indicating every received packet in the other set.

14. The method of claim 1, wherein packets in the set are disposed in a sequence and each packet is provided to the destination in relation to the order of its position in the sequence.

15. The method of claim 1, subparagraph (b), further comprising, employing a congestion control process to send each packet towards the destination, wherein the congestion control process employs a conservative congestion control process.

16. The method of claim 1, subparagraph (b), further comprising, employing a congestion control process to send each packet towards the destination, wherein the congestion control process employs a moderate congestion control process.

17. A system for communicating data with a packet based protocol over a network, comprising:
    (a) a destination for packets sent over the network; and
    (b) a mobile device that performs actions, including: (i) employing the packet-based protocol to send a set of packets over the network towards the destination; (ii) if an acknowledgement for receiving at least one of the packets in the set is delayed, periodically sending one packet in the set until the destination acknowledges receiving the one packet in the set that is sent periodically; and (iii) employing the acknowledgement of the one packet in the set that is sent periodically to provide information identifying each unreceived packet in the set and employing the identification information to periodically resend one unreceived packet in the set until the destination acknowledges receiving each resent packet in the set.

18. An apparatus for communicating data with a packet based protocol over a network, comprising:
    (a) a network interface that employs the packet-based protocol to send a set of packets over the network towards a destination; and
    (b) circuitry operable to perform actions, the actions including: (i) employing the packet-based protocol to send a set of packets over the network towards a destination; (ii) if the acknowledgement for receiving at least one of the packets in the set is delayed, extending the set of packets to include a new packet and periodically sending at least one new packet in the extended set to the destination until the destination acknowledges receiving at least one new packet in the extended set; and (iii) employing the acknowledgement of at least one packet in the extended set to provide information identifying each unreceived packet in the extended set and employing the identification information to periodically resend one unreceived packet in the extended set until the destination acknowledges receiving each resent packet in the extended set.

19. The apparatus of claim 18, wherein the one packet in the set that is sent periodically is the last packet in the set that was sent to the destination.

20. The apparatus of claim 18, wherein the circuitry is arranged to automatically extend the set of packets to include another packet and periodically send the other packet towards the destination until another acknowledgement is received indicating that the other packet in the extended set is received by the destination.

21. The apparatus of claim 18, wherein the circuitry is arranged to automatically adjusting adjust the periodic resending of each unreceived packet towards the destination.

22. The apparatus of claim 18, wherein the packet-based protocol includes at least one of TCP or SCTP.

23. The apparatus of claim 18, wherein the acknowledgement from the destination is at least one of a SACK message and an ACK message.

24. The apparatus of claim 18, wherein the circuitry is arranged to employ a congestion control process to send each packet towards the destination, wherein the congestion control process employs a conservative congestion control process.

25. The apparatus of claim 18, wherein the circuitry is arranged to employ a congestion control process to send each packet towards the destination, wherein the congestion control process employs a moderate congestion control process.

26. A computer-readable medium comprising instructions for performing actions, the actions including:
(a) employing a packet-based protocol to send a set of packets over a network towards a destination;
(b) if the acknowledgement for receiving at least one of the packets in the set is delayed, extending the set of packets to include another packet and periodically sending at least the other packet towards the destination until another acknowledgement is received indicating that at least the other packet in the extended set is received by the destination; and
(c) employing the acknowledgement of the other packet in the extended set that is sent periodically to provide information identifying each unreceived packet in the extended set and employing the identification information to periodically resend at least one unreceived packet in the extended set until the destination acknowledges receiving each resent packet in the extended set.

27. A system for communicating data with a packet based protocol over a network, the system comprising:
(a) means for employing the packet-based protocol to send a set of packets over the network towards a destination;
(b) means for i) extending the set of packets to include another packet and ii) periodically sending at least the other packet towards the destination until another acknowledgement is received indicating that at least the other packet in the extended set is received by the destination if iii) the acknowledgement for receiving at least one of the packets in the set is delayed; and
(c) means for i) providing information that identifies each unreceived packet in the extended set, based on the acknowledgement of the other packet in the extended set that is sent periodically and ii) employing the identification information to periodically resend at least one unreceived packet in the extended set until the destination acknowledges receiving each resent packet in the extended set.

28. The method of claim 1, wherein each packet in the set includes instructions for the destination to provide an acknowledgement indicating every received packet in the set.

29. The system of claim 17, wherein each packet in the set includes instructions for the destination to provide an acknowledgement indicating every received packet in the set.

30. The apparatus of claim 18, wherein each packet in the set includes instructions for the destination to provide an acknowledgement indicating every received packet in the set.

* * * * *